(12) United States Patent
Choi

(10) Patent No.: US 9,638,177 B2
(45) Date of Patent: May 2, 2017

(54) DEVICE HAVING A VIBRATION BASED PROPULSION SYSTEM

(76) Inventor: Kyusun Choi, State College, PA (US)

(*) Notice: Subject to any disclaimer, the term of this patent is extended or adjusted under 35 U.S.C. 154(b) by 1058 days.

(21) Appl. No.: 13/253,248

(22) Filed: Oct. 5, 2011

(65) Prior Publication Data

US 2012/0079915 A1 Apr. 5, 2012

Related U.S. Application Data

(60) Provisional application No. 61/389,794, filed on Oct. 5, 2010, provisional application No. 61/484,278, filed on May 10, 2011.

(51) Int. Cl.
*F16H 27/04* (2006.01)
*F03G 7/10* (2006.01)

(52) U.S. Cl.
CPC .......... *F03G 7/10* (2013.01); *Y10T 74/18528* (2015.01)

(58) Field of Classification Search
USPC .... 74/84 R, 84 S, 88, DIG. 9; 440/9, 10, 13, 440/16–18, 113; 114/312, 330, 337; 604/95.01; 310/12.03, 20, 75 R, 80
See application file for complete search history.

(56) References Cited

U.S. PATENT DOCUMENTS

| | | | |
|---|---|---|---|
| 1,596,934 A | 8/1926 | McHugh et al. | |
| 1,743,978 A * | 1/1930 | Quisling | 440/13 |
| 2,704,185 A | 3/1955 | Tavares | |
| 2,881,558 A | 4/1959 | Bell | |
| 3,154,043 A | 10/1964 | Momsen, Jr. | |
| 3,435,800 A | 4/1969 | Osterwalder | |
| 3,580,356 A | 5/1971 | VanStavern | |
| 3,942,465 A * | 3/1976 | Bouix | 440/16 |
| 3,943,869 A * | 3/1976 | Frechette | 114/330 |
| 5,906,591 A * | 5/1999 | Dario et al. | 604/95.03 |
| 6,089,178 A * | 7/2000 | Yamamoto et al. | 114/337 |
| 6,332,865 B1 * | 12/2001 | Borody et al. | 600/114 |
| 6,500,033 B1 | 12/2002 | Sagov | |
| 6,702,734 B2 * | 3/2004 | Kim et al. | 600/114 |
| 6,716,074 B2 * | 4/2004 | Coulombe | 440/6 |
| 7,090,548 B1 * | 8/2006 | Gusler | 440/16 |
| 7,300,323 B1 * | 11/2007 | Bandyopadhyay | 440/13 |
| 7,317,275 B2 | 1/2008 | Treat | |
| 7,481,764 B2 * | 1/2009 | Soutorine et al. | 600/114 |
| 7,527,011 B2 * | 5/2009 | Smith | 114/315 |
| 7,643,865 B2 * | 1/2010 | Iddan et al. | 600/424 |

(Continued)

*Primary Examiner* — William Kelleher
*Assistant Examiner* — Jake Cook
(74) *Attorney, Agent, or Firm* — Buchanan Ingersoll & Rooney PC

(57) ABSTRACT

A device having a vibration based propulsion system includes at least one of an extendible and retractable diaphragm, a vibrating mechanism, and an expandable and collapsible body section for driving movement of the device. Some embodiments may also include one or more coverings configured to move to adjust the fluid resistance of the device to improve the efficiency of the device's movement. At least one processor may be connected to at least one of: a transceiver, sensors, a camera, and a drive system for controlling the operations of these mechanisms. A power source may also be attached to these elements of the device to power the device. A remote controller or other computer device may communicate with the device via the transceiver to provide input for steering the device or to receive data collected by the device.

19 Claims, 10 Drawing Sheets

(56) References Cited

U.S. PATENT DOCUMENTS

| | | | |
|---|---|---|---|
| 7,946,979 B2* | 5/2011 | Gilad et al. | 600/109 |
| 2003/0216622 A1* | 11/2003 | Meron et al. | 600/300 |
| 2008/0232636 A1 | 9/2008 | Thurber et al. | |
| 2012/0264341 A1* | 10/2012 | Mimlitch et al. | 440/13 |

* cited by examiner

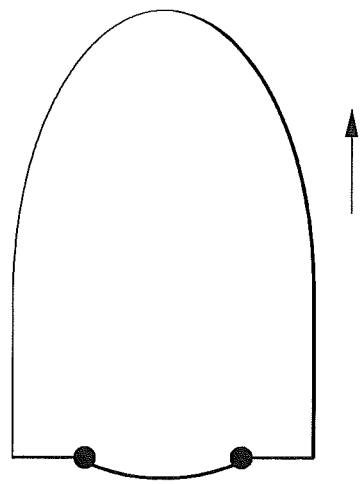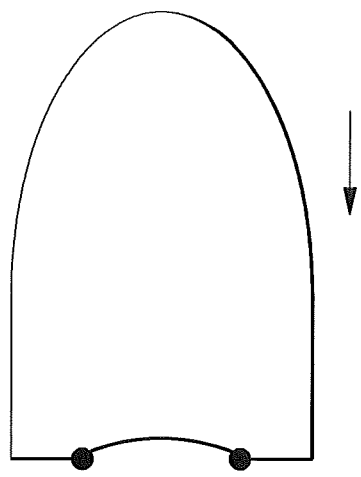
FIG.2A    FIG.2B
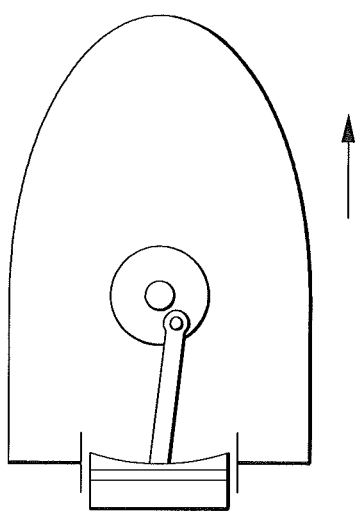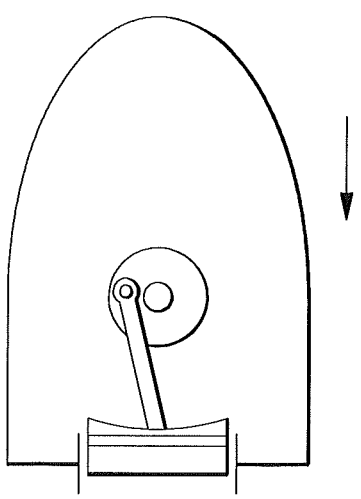
FIG.2C    FIG.2D

DEVICE HAVING A VIBRATION BASED PROPULSION SYSTEM

CROSS REFERENCE TO RELATED APPLICATIONS

The present application claims priority to U.S. Provisional Patent Application Ser. Nos. 61/389,794 filed on Oct. 5, 2010 and 61/484,278, filed on May 10, 2011. The entirety of U.S. Provisional Patent Application Ser. Nos. 61/389,794 and 61/484,278 is incorporated by reference herein.

FIELD OF THE INVENTION

The present invention relates to devices that utilize vibration propulsion systems. One preferred embodiment of such a device is a medical device that may move within a human body or other animal's body that utilizing at least one vibration causing mechanism to propel the device. The medical device could include sensors or other mechanisms, such as a camera or other tools for use in providing information to a user to assess the health of a human. Other preferred embodiments of the device include a torpedo sized watercraft, a transportation boat sized watercraft, a toy submarine and a toy boat sized watercraft.

BACKGROUND OF THE INVENTION

Vehicles such as cars are typically propelled by an internal combustion engine that powers the rotation of wheels to move the vehicle. Other vehicles, such as water vessels or naval ships utilize a power generation device such as a motor powered by gasoline or a nuclear reactor, to rotate propellers to move the vehicle. As another example, toy cars may be powered by batteries so that wheels are rotated.

Medical devices are typically manually maneuvered by surgeons or by robotic arms. Once a medical device is positioned in a person, that device is typically maintained in a stationary position or affixed to a part of a human's body.

Various types of propulsion systems are not suitable for in-body medical applications, such as devices that are small enough to navigate in a human body to fix faulty cells in the body. Wheels, propeller driven systems or like propulsion system may be damaging to cells and tissues. For instance, moving propellers may cut or damage a part of a human body. Also the wheels, propeller or like propulsion system may stop functioning in thicker body liquid or blood or in highly viscous body fluid or body slurry such as snot or interstitial fluid.

A new mechanism for propelling vehicles or devices is needed. Preferably, the new mechanism does not utilize wheels or propellers to push, pull or otherwise move a device. The new device may preferably have a drive system that permits the device to be designed for use in the human body.

SUMMARY OF THE INVENTION

A device such as a medical tool, medical diagnostic device, watercraft, toy, or other device is provided. An embodiment of the device includes a housing and at least one vibratable diaphragm attached to the housing. The at least one vibratable diaphragm is positioned such that each of the at least one vibratable diaphragm moves from an extended position extending away from the housing to a retracted position that is positioned closer to an interior of the housing than the extended position to drive movement of the device when the device is positioned in a fluid.

The device is preferably sized and configured to move within a human body, move in a body of water, move in plumbing, move in a sewage system, move in air, or move in a gaseous environment that is enclosed by an enclosure.

Embodiments of the device may include at least one power source connected to the at least one vibratable diaphragm within the housing. The at least one power source may be connected to a controller device via a direct connection or a wireless connection. The connection to the at least one power source may be comprised of a wireless power connection or a wired power connection. Preferably, the controller device is a wireless controller that controls steering and direction of movement for the device.

The housing of the device may have any of a number of shapes. For instance, the housing may have a bullet-like shape, a submarine shape or a conical shape. The at least one diaphragm may vibrate by moving parallel to a flow direction of a fluid or a moving surface to drive movement of the device.

Some embodiments of the device may include elements to help improve the efficiency of movement in one direction. For instance, embodiments of the device may include at least one covering attached to the housing that is configured to flop during movement of the device. The at least one covering may flop between a first position and a second position such that a width or height of the device is greater when the at least one covering is in the second position relative to when the at least one covering is in the first position. The flopping of the covering may be configured so that the covering flops to the second position during a forward movement of the at least one diaphragm during the at least one diaphragm's vibrational movement and the covering may flop into the first position during rearward movement of the at least one diaphragm during the at least one diaphragm's vibrational movement. Preferably, the at least one covering flops between the first and second positions for every vibration cycle of the at least one diaphragm.

In some embodiments, the housing of the device may be shaped such that a cycle of movement of the at least one vibratable diaphragm from the extended position to the retracted position provides a drag characteristic such that when the housing is within a fluid or is covered in a fluid, the housing moves forwardly for each of the cycle of movement of the at least one vibratable diaphragm Embodiments of the device may also include at least one of: a sensor, a detector and a camera positioned within the housing, on the housing, or adjacent the housing. These elements may be connected to a processor unit positioned in the housing that is also connected to the at least one diaphragm. The device may also include a wireless transceiver positioned in the housing that is connected to the processor unit.

A device is also provided that includes a housing having at least one collapsible section, and at least one power unit attached to the at least one collapsible section to cycle the at least one collapsible section between extended and collapsed positions. The at least one collapsible section may be sized and configured so that cycling of the at least one collapsible section between extended and collapsed positions moves the device when the device is positioned in a fluid.

At least one covering may be attached to the housing of the device so that the covering flops during movement of the device. The at least one covering may flop between a first position and a second position such that a width or height of the device is greater when the at least one covering is in the second position relative to when the at least one covering is in the first position. The flopping may occur to affect drag characteristics of the device so that the extending and retracting of the device results in a positive forward movement of the device or increases the amount of forward movement the device will experience from movement of the at least one collapsible section. The at least one power unit may also powers flopping of the at least one covering.

The at least one power unit may include at least one of a wireless power unit and a wired power unit. The device may also include a controller connected to the at least one collapsible section and the at least one covering to control the at least one collapsible section and the at least one covering such that the controller controls movement of the device.

It should be appreciated that embodiments of the device may be configured to include both at least one diaphragm and at least one collapsible section. The at least one diaphragm is preferably at least one vibratable diaphragm positioned such that each of the at least one vibratable diaphragm moves from an extended position extending from the housing to a retracted position extending toward an interior of the housing and moves synchronously with the at least one collapsible section to drive movement of the device.

Other embodiments of the device may include a housing, which may be a hull of a device, and at least one vibration causing mechanism. The at least one vibration causing mechanism may include at least one of: (a) at least one vibratable diaphragm attached to the housing that is positioned such that each of the at least one vibratable diaphragm moves from an extended position extending away from the housing to a retracted position that is positioned closer to an interior of the housing than the extended position to drive movement of the device when the device is positioned in a fluid; and (b) at least one vibrating device positioned in the housing that moves a weight forwardly and rearwardly within the housing to vibrate the housing to drive movement of the device.

The movement of the weight and cycles by which the diaphragm may be extended and retracted for generating movement of the device may be altered to create different movements of the device. For instance, the amplitude or frequency of movement of the diaphragm may be adjusted to generate different movements of the device. As another example, the weight may have its cycle of movement adjusted so that the weight moves further forwardly and less rearwardly or may be moved between forward and rearward positions more quickly or less quickly to adjust the movement of the device. The path of the weight's movement could also be tilted or rotated to generate a sideward element to the movements for adjusting the movement of the device.

In embodiments of the device that utilize multiple vibrating devices or vibrational diaphragms, different devices or diaphragms may be positioned to move along paths defining different directions. For instance, one device may move a weight forwardly and rearwardly to drive forward and rearward movement and another device may move a weight sidewardly to drive sideward movement.

In some embodiments of the device, the at least one vibration causing mechanism is comprised of the at least one vibration causing device. The at least one vibration causing device comprises a first vibration causing device having a motor that moves the weight from a first position to a second position and then moves the weight from the second position back to the first position in cycles. The weight is moved at a first rate of speed when moving from the first position to the second position and the weight is moved at a second rate of speed when moving from the second position to the first position to complete a cycle of movement of the weight. The first rate of speed may be faster or slower than the second rate of speed to generate asymmetric vibrations to provide a net movement in a desired direction after each cycle of movement of the weight. Alternatively, the first and second rates of speed may be the same speed. The first and second positions may define a linear path of movement of the weight. The weight may move directly forwardly and rearwardly along a linear path or may move forwardly and rearwardly along an angled path to also provide sideward movement in addition to forward or rearward movement capabilities for the device.

Some embodiments of the device may also have one or more collapsible sections formed in the housing. The collapsible sections may move between expanded and contracted positions to help move the device in addition to the one or more vibrational diaphragms or one or more vibration causing devices that may be included in an embodiment of the device. Of course, embodiments of the device may include at least one collapsible section and multiple vibration causing devices. The multiple vibration causing devices may include one or more vibrational diaphragms and one or more linear weight moving devices.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred embodiments of the device are shown in the accompanying drawings and certain present preferred methods of practicing the same are also illustrated therein. It should be appreciated that like reference numbers used in the drawings may identify like components.

FIG. 2A is a schematic view similar to FIG. 1 illustrating the first present preferred embodiment of the device with the diaphragm in an extended position.

FIG. 2B is a schematic view similar to FIGS. 1 and 2A illustrating the first present preferred embodiment of the device with the diaphragm in a retracted position.

FIG. 2C is a schematic view similar to FIGS. 1, 2A and 2B illustrating a third present preferred embodiment of the device with the diaphragm in an extended position. It should be appreciated that the piston mechanism for pushing the diaphragm illustrated in FIG. 2C is a component that is internal to the device.

FIG. 2D is a schematic view similar to FIGS. 1, 2A, 2B, and 2C illustrating the third present preferred embodiment of the device with the diaphragm in a retracted position. It should be appreciated that the piston mechanism for pushing the diaphragm illustrated in FIG. 2D is a component that is internal to the device.

DETAILED DESCRIPTION OF PRESENT PREFERRED EMBODIMENTS

Figure 1:
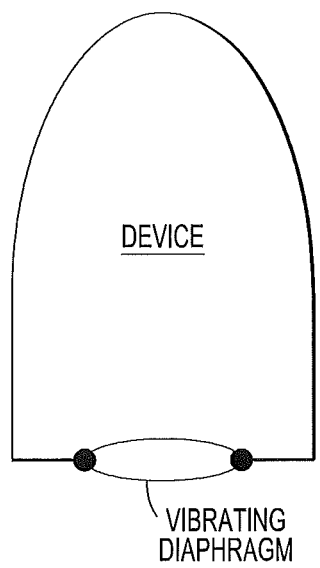
FIG. 1 is a schematic view of a first present preferred embodiment of the device.
Figure 1A:
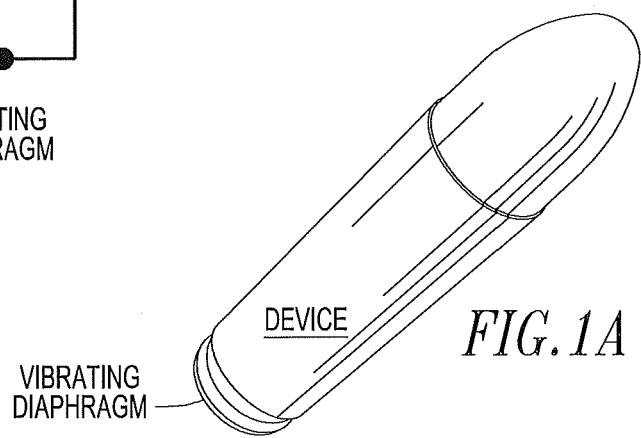
FIG. 1A is a perspective view of the first present preferred embodiment of the device.
Figure 1B:
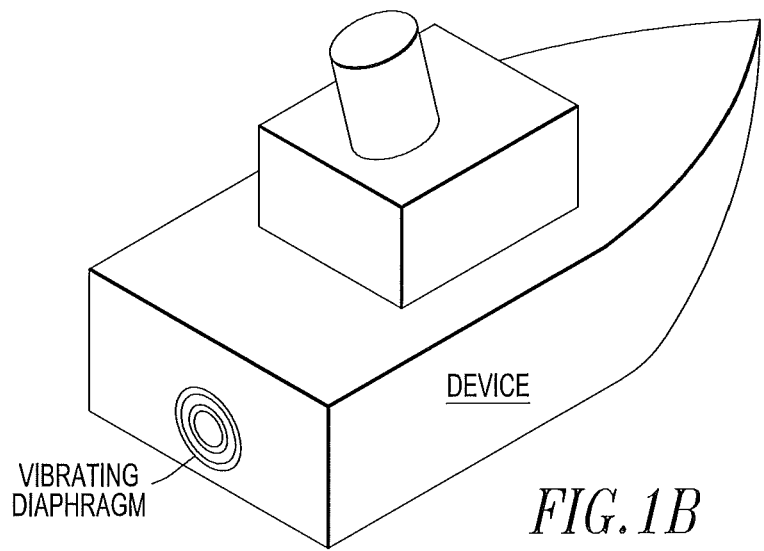
FIG. 1B is a perspective view of a second present preferred embodiment of the device.

Referring to FIGS. 1-1B, a vibrating diaphragm may be positioned integral with an outer hull or housing of a device to propel the device or may be attached to the housing and positioned adjacent to the exterior of the housing such that a portion of the diaphragm may extend out of the housing and then move into and extend out of the housing during vibration cycles of the diaphragm.

A vibrating diaphragm may be part of a propulsion system for propelling different devices. The diaphragm may be configured to be actuated by remote control or by a direct connection. An example of a vibrating diaphragm may be an audio magnetic speaker or an acoustic piezo speaker. Of course, other vibrating diaphragm mechanisms could also be utilized in embodiments of the vibrating system.

It should be understood that embodiments of the device may include more than one diaphragm. For instance, there can be two, three, four, five, etc. diaphragms installed in a device. If the multiple diaphragms are installed in the same side or same direction of a device, they could be configured to all vibrate synchronously to add vibration power. Also they can vibrate asynchronously or independently to steer, rotate, and cause various combinations of movements. The diaphragms can be installed on different sides and/or different directions of a device to create, enhance, or control different device movements.

FIGS. 2A-B shows movement of a device that includes a vibration propulsion system that has a vibrating diaphragm positioned on or adjacent to a rear outer wall of the housing of the device. FIGS. 2A-2B illustrate movement of the device when the diaphragm is pushed-out, when the diaphragm is pushed-in, and the net movement resulting from one cycle of the pushing in and out movement of the diaphragm.

The net movement result is due at least in part to the shape of the device's housing, or exterior surface. A device that has a "bullet-like" shape or a steep domed shape will move more distance forward due to less resistance from the fluid in which the device may be positioned, such as blood, air or water, when the diaphragm pushes out. The front side of the device is tapered where the other side (back) of the device is not tapered as shown. The device will move less distance backward due to more resistance from the fluid when the diaphragm pushes in due to the shape of the rear of the exterior surface, which may be rectangular or polygonal. With repeated push out-in cycles of the diaphragm, the device will move forward as the diaphragm vibrates forward and backward (or pushes in and out in repeated cycles).

The diaphragm may be powered by any of a number of energy sources. For instance, batteries may be coupled to the diaphragm to power the diaphragm. As another example, solar cells, a generator or a motor that runs on conventional fuels such as diesel, jet fuel, kerosene, or gasoline may be connected to the diaphragm.

It should be understood that the shape of the exterior surface or housing of the device may impact the fluid resistance created by movement of the device. For instance, the shape of the housing may cause a fluid such as blood, water, or air to provide different resistance to different directions of movement, such as rearward and forward movement.

Along the diaphragm's pushing axis, an example of which may be seen in FIG. 2, the shapes of the front and rear of the device's housing are different in that the fluid resistances for the forward movement and backward movement are different. The net difference will cause overall movement of the device to move forward or backward. The device moving speed will be affected by the magnitude of the resistance difference. Various shaping and tapering can be applied to form the housing of the device. Depending on the fluid in which the device is to be positioned in for movement and design objectives of the device, the exterior surface of the device or the housing of the device may be sized and configured to result in faster device moving speed, or better energy efficiency, or better manufacturing ease, etc.

FIGS. 2C-D illustrate another embodiment of the device. The device may utilize a diaphragm that is pushed from an extended position out of the body of the device or housing of the device and pulled back into the body of the device or housing of the device via a rotating mechanism.

The rotating mechanism may be a portion of a piston mechanism that moves to push or otherwise move the device in a fluid such as blood or water. The rotating mechanism may include a rotating member such as a crankshaft, a pulley or disc that is rotated by a motor powered by a power source such as a battery. A rod, bar or other type of elongated member may be attached to the rotating member and may extend from the rotating member. The elongated member may have an end that is pivotally connected to the rotating member. An opposite end of the elongated member may be pivotally connected to a diaphragm member, piston member, or extendible member. The diaphragm member may be moved into the housing of the device or out of the housing of the device via rotation of the rotating member. One full rotation of the rotating member may complete one cycle of push-in and push-out movement of the diaphragm member. As indicated in FIG. 2A, the shape of the housing may be configured so that a full rotation of the rotating member provides a net movement in a forward direction due to the shape of the housing and the net force provided by movement of the diaphragm member. It should be understood that some embodiments of the device may not need the use of any spring member or coil spring members positioned adjacent to or otherwise connected to the elongated member to facilitate movement of the diaphragm member.

Figure 3:
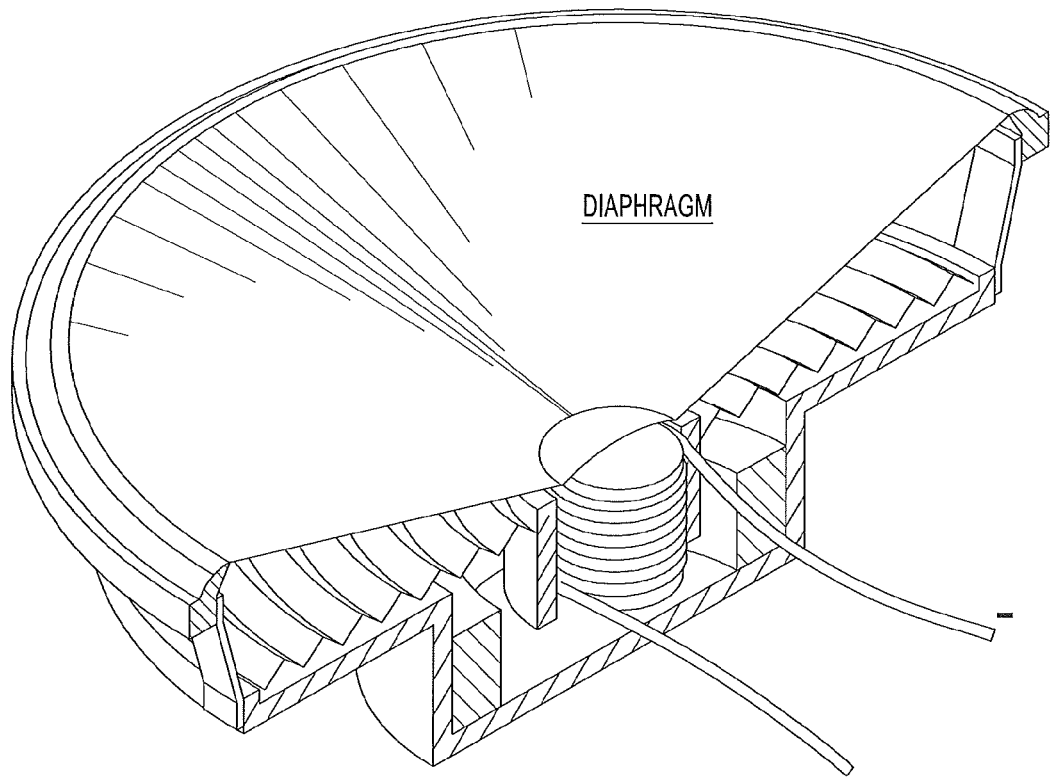
FIG. 3 is a perspective view of a present preferred diaphragm that may be utilized in embodiments of the device. A portion of the diaphragm is cut away to illustrate other components of the diaphragm.

FIG. 3 shows a magnetic audio speaker, which is one type of diaphragm that may be used in embodiments of the device. The diaphragm of an audio speaker is moving in and out (vibrating) based on an electrical signal applied to the diaphragm. Given a 100 Hz sine wave audio signal, the diaphragm vibrates in air, causing a 100 Hz tone sound generation. One implementation of the present invention can utilize such an audio speaker. One can make the diaphragm and other material water proofed for use in devices that may move in water or other liquid type fluids such as blood. The speaker may be mounted in a housing that is shaped like the hull of a boat, the hull of a torpedo, the hull of a submarine, or a bullet-like shaped housing as may be appreciated from FIG. 1.

Although the speaker diaphragm push-out and push-in force is relatively weak due to the nature of the audio output, the force may be enough to push and pull the device body for it to move. The movement of the device will depend on the mass of the device, the power of the speaker, and the fluid in which the device is to move within. Of course, other factors may also effect movement of the device, such as fluid currents or other conditions.

Figure 4:
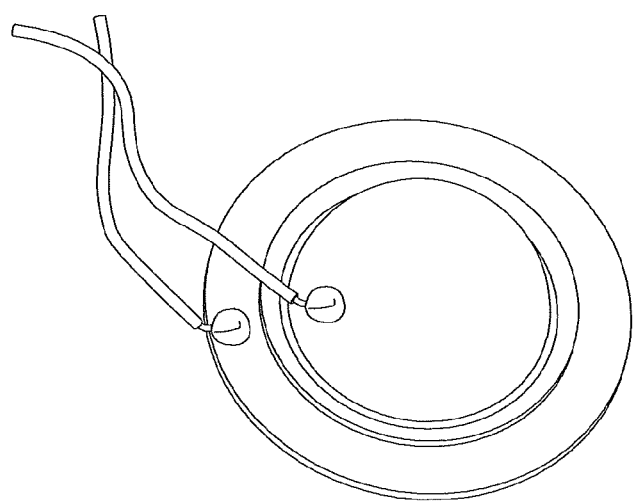
FIG. 4 is a perspective view of another present preferred diaphragm that may be utilized in embodiments of the device.
Figure 5:
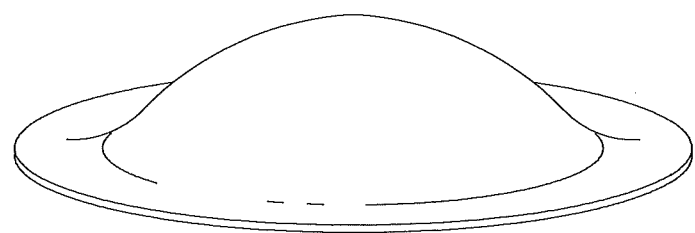
FIG. 5 is a perspective view of a first diaphragm configuration that may be utilized for extending the diaphragm to an extended position.

FIG. 4 shows another example diaphragm, which is an acoustic piezo speaker. Instead of the moving coil causing the diaphragm to move, the diaphragm is made of piezo material and it vibrates based on the applied electrical signal. FIG. 5 shows one vibration mode or configuration in which a diaphragm may extend and retract. Of course, different configurations or modes may be utilized as desired to meet different design objectives.

Figure 6:
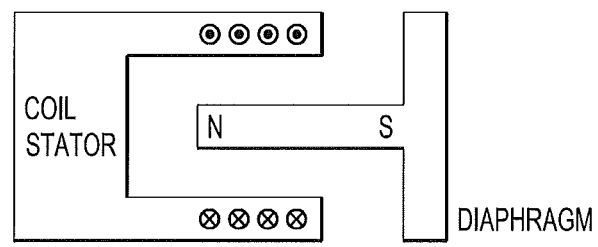
FIG. 6 is a schematic view of an embodiment of a propulsion system that may be utilized in embodiments of the device that includes a diaphragm extended via a magnetic system.

Another example diaphragm is shown in FIG. 6. Similar to a magnetic speaker, the diaphragm is attached to a magnet and a coil to create the magnetization flux based on signal current. The magnetization flux may be stationary, or non-changing, in this case. Of course, other diaphragm designs using a motor to push or pull a diaphragm may also be utilized to create a vibrational force to move a device.

Figure 7A:
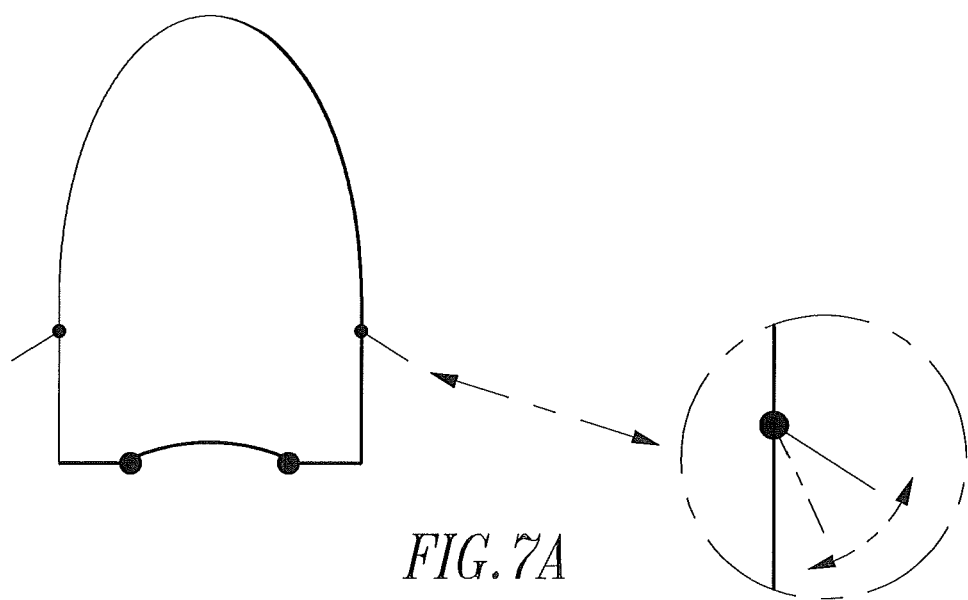
FIG. 7A is a schematic view a present preferred device that utilizes members to add more efficient forward movement and to aid steering of the device.

The moving speed of the device may be improved or may be made more efficient by adding a covering to the housing. For instance, a conic shade may be positioned over at least a portion of the housing of the device. FIG. 7A shows an example of a conic shaped covering that may be positioned over a portion of the housing of a device or may be attached to an exterior portion of the device.

Figure 7B:
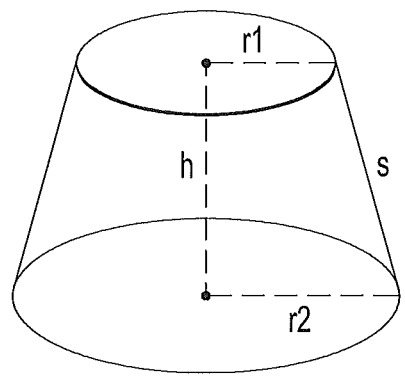
FIG. 7B is a schematic view of a truncated cone that can be added to the hull or housing of the device to produce a greater difference between forward and backward resistance to make the device move forward more efficiently. Adding one or more cones or coverings around the housing or body of the device can make the device move in liquid or non-liquid environments such as a desktop or a portion of a human or animal body surrounded with muscle tissue.

The conic covering may be a conic shade, for example. The conic shade may improve the magnitude of the water resistance differences during the forward and backward movement of the diaphragm vibration cycles. Moreover, an additional improvement can be made if the conic shade is configured with one or more flippers or other mechanisms that may move, as shown in FIG. 7 so that the shade moves between retracted and extended positions. The housing geometry of the device shown in FIG. 7A may be appreciated from FIG. 7B. The shade may include parameter: r1, r2, and s as shown in FIG. 7B. The movement of the shade between retracted and extended positions may be considered a "flopping" movement." By "flopping," the parameter r2 changes. When the device is moving forward the r2 decreases, and when the device is moving backward the r2 increase. As may be appreciated from FIG. 8, when the device is moving in a fluid, the fluid resistance increases if r2 is increasing and the fluid resistance decreases if r2 is decreasing. In water, for example, the flopping of the conic shade can be achieved naturally based on the device moving direction or can be achieved synchronously based on the electrical signal that moves the diaphragm to push-out and push-in the diaphragm or by a different electronic signal that is provided to the conic shade via a powering device. The limit of r2 change can be assumed so that improvements made to the mechanisms utilized to perform the "flopping" may be optimized.

Figure 7C:
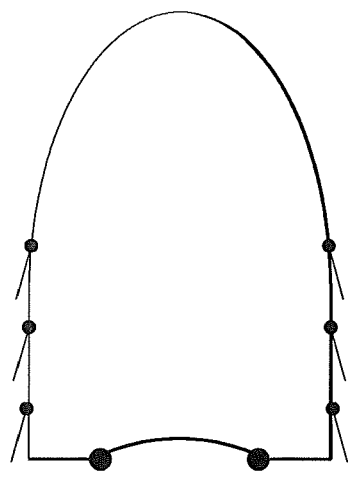
FIG. 7C is a schematic view of a present preferred device that utilizes multiple sets of members to add more efficient forward movement and to aid steering of the device. The members shown in FIG. 7C are in a retracted position to decrease the drag of the device.
Figure 7D:
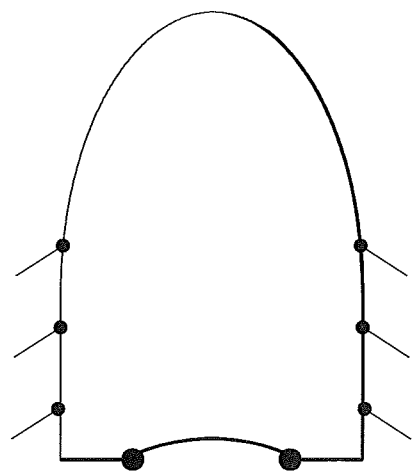
FIG. 7D is a schematic view of a present preferred device that utilizes multiple sets of members to add more efficient forward movement and to aid steering of the device. The members shown in FIG. 7D are in an extended position to increase the drag of the device.

Referring to FIGS. 7C and 7D, moveable members may also be provided in combination with one or ore coverings or as an alternative to one or more coverings. The moveable members may move, or flop, from a folded, or retracted, position to an unfolded, or extended position. The moveable members may be configured to move to their retracted positions to reduce the drag of the device during a portion of the cycle of movement of the diaphragm that extends the diaphragm out of the housing for generating vibration of the housing of the device for driving movement of the device. The moveable members may move from the retracted position to an extended position when movement of the diaphragm retracts into the housing, which generates a rearward movement to increase the drag of the device for reducing the amount of rearward movement that occurs so that the device has more net forward movement after every cycle of movement of the diaphragm.

It should be appreciated that a controller that includes at least one processing element such as at least one microprocessor and memory such as non-transitory memory coupled thereto may be coupled to the covering, one or more moveable members, and the diaphragm of the device to control movements of the diaphragm, at least one moveable member, and the covering. The controller may be, for example, a computer, remote controller mechanism, or other electronic device. The controller may include software that is stored in the memory and processed by the one or more processor elements to oversee or control the movements of the diaphragm and the covering. The controller may wirelessly connect to the device or may have a direct connection via a wire or other communication element. The controller may also include a wireless power supply or wired power supply to power the device.

The covering may be made with a number of panels or may be made as a unitary structure. For the one example, panels may be interconnected together to form the covering and may be allowed to flop and overlap as fishes are covered with scales. Another example of a covering may be a covering that utilizes a vertically wrinkled twill-curtain like shade.

The moveable members may be pivotable fingers, projections, moveable scales, or other members moveable or pivotally attached to the housing of the device for moving between retracted and extended positions for affecting the net movement of the device in one direction for each cycle of movement of the diaphragm used to generate movement of the device.

Figure 8A:
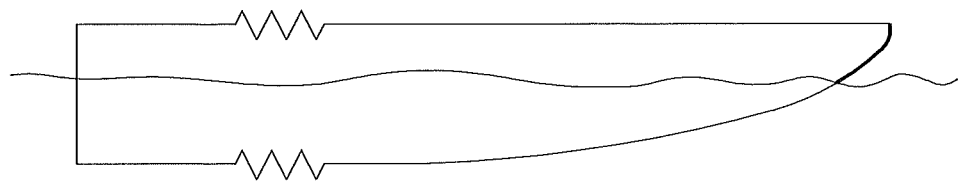
FIG. 8A is a schematic view of a present preferred device that has an extendable and retractable body portion for driving movement of the device.

In other embodiments of the device, the device may be configured so that the housing of the device vibrates. FIG. 8A shows a different example of a device that has its housing vibrate. The housing of the device may have a folding portion or a collapsible portion. The folding portion of the housing may be positioned at the bottom of a device or near the rear of a device to create a sufficient force differential to permit forward movement of the device. The device may vibrate along a length of the device, such as the length of the folding portion so that the device vibrates and the device moves forward as a net result. Numerous different housing shapes may be utilized for such devices.

Figure 8B:
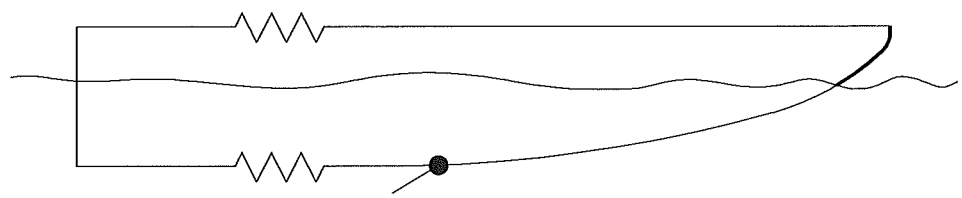
FIG. 8B is a schematic view of yet another present preferred device that has an extendable and retractable body portion for driving movement of the device and also includes a moveable member to aid in the moving and steering of the device.

As may be appreciated from FIG. 8B, embodiments of the device may also utilize one or more folding elements or steer elements that may moveably project from the housing of the device to help steer the device or to help control movement of the device. For instance, a plate or other member may be pivoted to the housing of the device and be configured to rotated to help steer the device or to affect movement of the device.

Figure 8C:
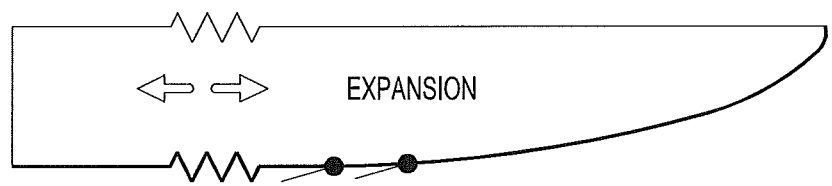
FIG. 8C is a schematic view of yet another present preferred device that has an extendable and retractable body portion for driving movement of the device and also includes multiple moveable members to aid in the moving and steering of the device. The moveable members of FIG. 8C are shown in a retracted position to decrease the drag generated by the device.
Figure 8D:
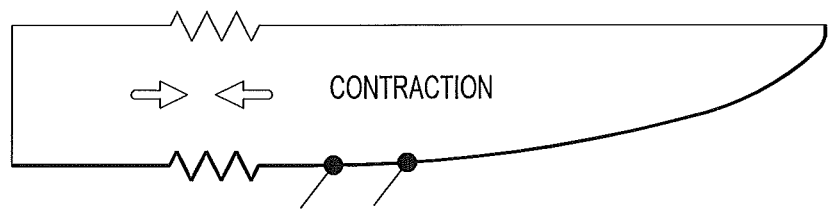
FIG. 8D is a schematic view of similar to FIG. 8C that illustrates the moveable members in an extended position to increase the drag generated by the device.

Embodiments of the device may also include a set of moveable members or multiple sets of moveable members to effectuate a greater net movement in a desired direction for each cycle of contraction and expansion of the collapsible section of the housing of the device. Referring to FIGS. 8C and 8D, a device may included a set of flippers or members that are positioned forward of the collapsible section. The members may move to a retracted position during extension or expansion of the collapsible section and may move to the extended position during contraction of the collapsible section.

Figure 8E:
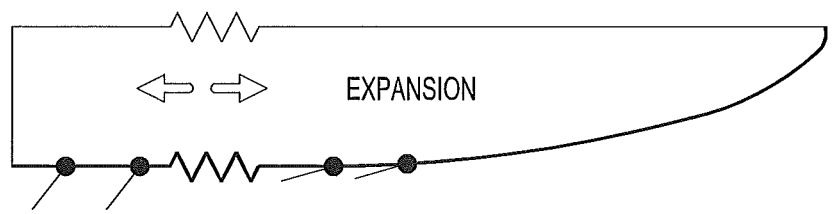
FIG. 8E is a schematic view of yet another embodiment of the device having multiple sets of moveable members. The rear set of moveable members is extended and the rear set of members is retracted when the collapsible section of the device is expanded.
Figure 8F:
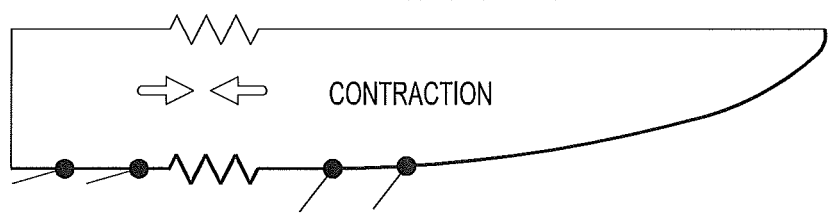
FIG. 8F is a schematic view similar to FIG. 8E, which shows that the rear sets of members is retracted and the forward set of members is extended when the collapsible section of the device is retracted or contracted.

Referring to FIGS. 8E and 8F, the device may also include another set of members' rearward of the collapsible section. The rearward set of members may also be moveable from extended to retracted positions. The rearward set of members may move to a retracted position during expansion or extension of the collapsible section and may move to an extended position during contraction, or retraction or the collapsible section. The movement of the members may be configured to help improve the net forward movement of the device for each of movement between expanded and contracted positions of the device.

It should be understood that embodiments of the device may include more than one collapsible portion or folding portion. For instance, there can be two, three, four, five, etc. collapsible portions of a housing included in an embodiment of the device. If the multiple collapsible portions are installed, they can all vibrate synchronously to add vibration power or they could vibrate asynchronously or independently to steer, rotate, and various combinations of movements. The collapsible portions may be installed on different sides and/or different directions of a device to create, enhance, or control different device movements.

It should also be appreciated that embodiments of the device may include both one or more collapsible portions of a housing along with one or more vibrating diaphragms to move the device via vibrational movement. Different power sources may be coupled to the diaphragm and collapsible portions or the same power source may power movement of both mechanisms. The power source may be a battery, an electric generator, a fuel powered generator, or a fuel powered motor, for example.

A controller may be coupled to the diaphragm and collapsible sections for controlling movement of these mechanisms to control movement of the device. The controller may include, for example, a computer or remote controller device. The controller may include a wireless transceiver so that the controller can be accessed remotely by a remote controller so a user may provide input to the controller to control movement of the device. In other embodiments, the controller may include one or more transmitters and one or more receivers for receiving input from a user via an input device and transmitting output to a device via the one or more transmitters. The output may be sent to a computer device such as a computer, computer device, or remote control.

Figure 9A:
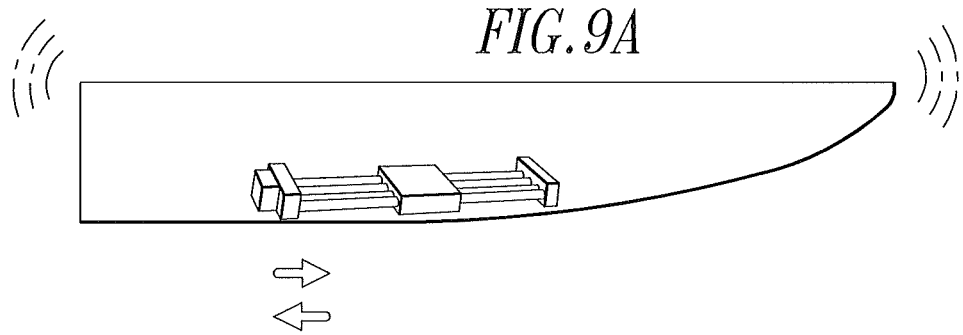
FIG. 9A is a schematic view of yet another present preferred device, which utilizes a linearly moving mechanism for creating a vibration that drives movement of the device. One or both ends of the device may be affixed within the housing. The two opposite ends may define the path of travel along which the motor of the device may move the weight for generating vibrations for driving movement of the device.

Instead of attaching the vibrating diaphragm to a vehicle or having a housing of the device extend and retract, one can also make the vehicle or device itself vibrate. FIG. 9A shows one example of a device having such a vibrating propulsion system. The device's shape may be configured to create a desired fluid resistance, such as a desired water resistance that may provide differences during the forward and backward movements when the device vibrates. One may even install a few folding panels at the device bottom to create even more fluid resistance difference. Along the length of the device, the device can be made to vibrate using linear sliding mass object. As the vehicle vibrates forward and backward, the vehicle moves forward as a net result. The weight of the sliding mass and force and extent to which the mass is moved in opposite directions or different directions can provide a net movement in a desired direction.

Figure 9B:
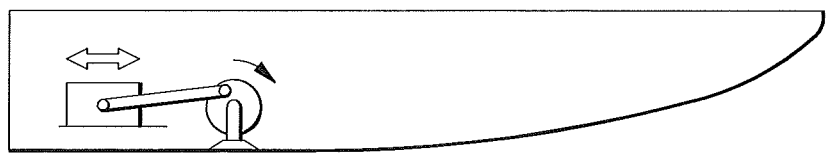
FIG. 9B is a schematic view of yet another present preferred embodiment of the device that utilizes a motor for moving a weight between different positions within the housing of the device to generate vibrations for moving the device.
Figure 9C:
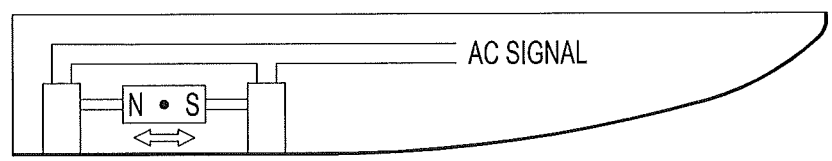
FIG. 9C is a schematic view of yet another present preferred embodiment of the device that utilizes a magnet actuator for moving a magnetic weight between different positions within the housing of the device to generate vibrations for moving the device.

Referring to FIGS. 9B and 9C, a linear vibrator vibration causing mechanism may be configured to move a weight within the housing of the device in a number of different ways. For instance, a rotor may rotate a support extending from the rotor to a weight to move the weight forwardly and rearwardly as the rotor rotates. As another example, electromagnets may be actuated to move a magnetic weight forwardly and rearwardly to oscillate movement of the magnetic weight. A forwardly positioned element may be magnetized via an electrical circuit to move the magnetic weight forwardly and, after reaching its forward most position, that element may be deactivated and a rear element may be actuated via an electronic signal to magnetize the element and move the magnetic weight to its rearward position. The oscillation of the weight within the housing may vibrate the device.

Figure 9D:
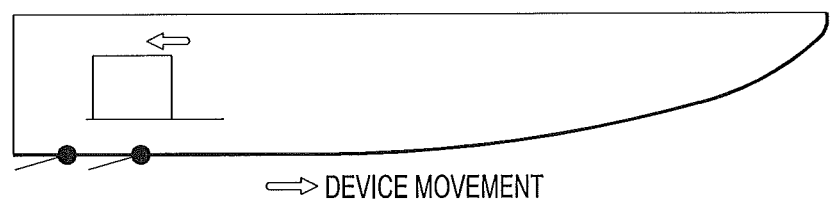
FIG. 9D is a schematic view of another present preferred embodiment of the device that utilizes a moving weight to generate vibrations of the device for driving movement of the device. Moveable members are attached to the housing of the device, or hull of the device, for moving the device. The moveable members are shown in a retracted position for rearward movement of the weight that is moved rearwardly to drive forward movement of the device.
Figure 9E:
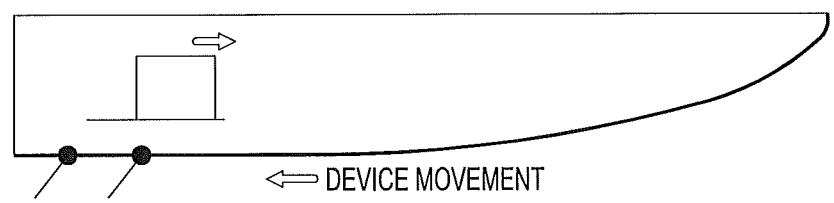
FIG. 9E is a view similar to FIG. 9D of the device. The weight is moved forwardly in FIG. 9E and the moveable members are shown extended to provide grater drag as the weight is moved forwardly to create a rearward movement so that the net movement of the device within a cycle of weight motion is forwardly.

Referring to FIGS. 9D and 9E, the device may also include flippers or members configured to move from retracted or folded positions to unfolded or extended positions. The members may be retracted during rearward movement of the weight, which may generate a forward movement of the device. The members may be extended during forward movement of the weight to provide a greater drag to limit any rearward movement of the device associated with the forward movement of the weight.

Figure 9F:
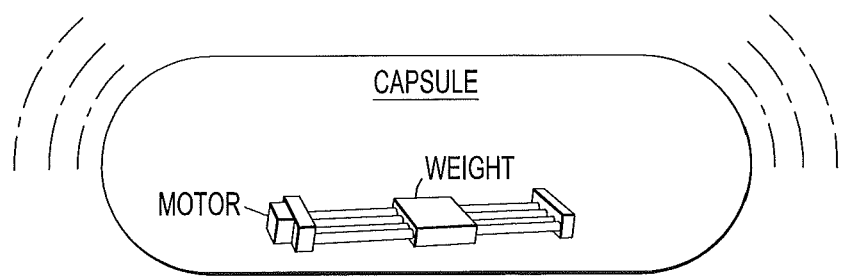
FIG. 9F is a schematic view of another embodiment of the device that utilizes a vibration causing mechanism.
Figure 9G:
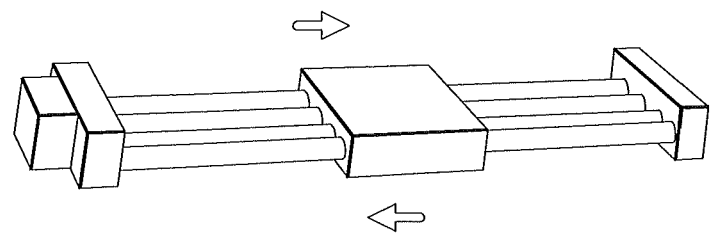
FIG. 9G is a perspective view of an embodiment of a vibration generating device that may be configured to utilize symmetric vibrations by moving a weight at the same speed forwardly and rearwardly for generating symmetric vibrations or may by adjusted to move the weight forwardly more slowly than the speed at which the weight is moved rearwardly to generate asymmetric vibrations. Of course, the weight could also be moved rearwardly at a speed that is slower than the speed at which the weight is moved forwardly to generate such asymmetric vibrations as well.

Referring to FIGS. 9F-9G, embodiments of the device may have a motor that moves a weight along a straight path, or linear path, within the housing. For instance, the weight may be moved forwardly and rearwardly or move from a left side position to a right side position via the motor in cycles to generate vibration of the housing. One end of the device or both ends of the device may be affixed to the housing. The weight may slide along one or more bars or rods extending between the two ends of the device. A motor may then generate motion of the weight between the two ends along the bars or rods. When the weight is moved by the motor, the device which contains the weight moving mechanism will also move due to the action-reaction principle (device moves to the opposite direction of the weight moving direction).

The weight may be moved at the same rate of speed when moved in both directions to generate a symmetric vibration. Alternatively, the weight may be moved at a first speed in a first direction and at a second speed that is faster or slower than the first speed in a direction that is opposite the first direction. The asymmetric vibration of the device results in overall net movement of the device even when the shape of the device housing, or hull, is symmetric as shown in FIG. 9F. A battery, electric generator, or other power source may provide power to the motor. The motor's motion may be controlled by a controller or computer chip attached to the motor. Alternatively, a remote controller may communicate via a wireless connection to the motor to control the motion of the weight.

Embodiments of the device may be preferably configured for movement when fully positioned in a fluid, such as blood, water, or another type of liquid or slurry-type environment. The housing of the device may be shaped similar to the hull of a boat, submarine or torpedo, for instance. Embodiments of the device may be sized for use as a medicine pill, pill-camera, sono-pill, micro-robot pill etc. Another possible environment such a device may be placed is sewage, plumbing environments, or other liquid environments.

It is also contemplated that embodiments of the device may be configured to move in air or other gaseous environments. Because material density is usually much less in gaseous environments as compared to liquid environments, overall device mass will typically have to be much less for use in air environments as opposed to liquid environments. For example, a device similar to the device shown in FIG. 9A may be placed in a tube, canister or pipe like environment filled with air and move within the tube, canister, or pipe. The device may vibrate along the length of the device housing to move the device forward as a net result. When the device is loosely fitted in the tube, canister, or pipe, device movement can be achieved even if the canister, tube or pipe is only air filled. The connection of a sensor, detector, or camera to such devices may help identify or better assess conditions that may exist in the environment the device is to be placed. Preferably, the device has a wireless transceiver for sending data collected by the device to another device for collection of the data, storage of the data, displaying of the data, or further manipulation of the data collected by the device.

The moving speed and energy efficiency of embodiments of the device may be dependent on the vibrating diaphragm design, design of the exterior surface of the housing, or the design of the folding portions or collapsible portions of the housing. For some embodiments, the vibration force applied to the device may be dependent on the diaphragm size, shape, and actuation signal amplitude. It is contemplated that a particular frequency for diaphragm actuation signal may be more effective than others as well, depending upon the design of the device. Optimal efficiency for a particular design may be achieved with different housing designs that utilize different signal frequency for meeting a particular design objective. Also the different signal types can be used to achieve more optimized efficiency. Typically well known signal wave types such as sine wave, square wave, triangle wave, and saw-tooth wave may be utilized for embodiments of the device. Of course, other signal wave types may alternatively be utilized in different embodiments of the device.

Device Environment:

Water (or liquid) environment is a very good example application of this invention. For this case, the device type can be boat, ship, submarine, torpedo, etc. Also similar environment is human body or an animal body. Such cases are for the medicine pill, pill-camera, sono-pill, micro-robot pill embodiments of the device. Such embodiments may include a payload portion of a housing for storing a treatment mechanism, drug, or surgical tool in a payload portion of the housing. The payload portion of the housing may be openable to deposit the drug, or apply a tool or treatment mechanism when the device is in a desired position.

Another possible environment is the sewage, a liquid moving through pipes or plumbing of, a lake, a river or an ocean. Of course, there may be other water related environments for the invention.

An air or other gas environment is another example environment in which an embodiment of the device may be configured to operate. One can build an embodiment of the device to move in an air environment. Because the material density is much less in gaseous state then the aqueous state, overall vehicle mass has to be much less in air environment for the current invention system to work effectively. For the demonstration, one can build a similar vehicle shown in FIG. 7A and place the vehicle in a cylinder or pipe like environment filled with air instead of water. Along the length of the vehicle, the vehicle vibrates and the vehicle moves forward as a net result. When the vehicle is loosely fitted in the cylinder or pipe, vehicle movement can be achieved even if the environment is only air filled.

It should be understood that embodiments of the device may be configured to operate within a fluid that has a flow rate. For instance, embodiments of the device may travel in a river, a pipe of fluid, or in a human body such that the vibrating diaphragms of the device move in a direction that is the same as the flow direction of the fluid or move in a direction that is parallel to the direction in which the fluid flows.

It should be appreciated that device moving speed and energy efficiency is dependent on the vibrating diaphragm design. The vibration force applied to the vehicle is also dependent on the diaphragm size, shape, and actuation signal amplitude. We observed some frequency of the diaphragm actuation signal more effective than others. Optimal efficiency is achieved with different vehicle construction with different signal frequency. Also the different signal types can be used to achieve more optimized efficiency. Typically well known signal wave types are: sine wave, square wave, triangle wave, and saw-tooth wave. But other signal wave type may result in better optimization based on the vibration diaphragm and device design.

As noted above, one can install more than one diaphragm on or in a device. There can be two, three, four, five, etc. diaphragms installed on a vehicle or device, for example. If the multiple diaphragms are installed in same side same direction of a vehicle, they can all vibrate synchronously to add vibration power. Also they can vibrate asynchronously or independently to steer, rotate, and permit various combinations of movements. The vibrational cycles may be changed to create different movements of the device as well. The diaphragms can be installed on different sides and/or different directions of a vehicle to create, enhance, or control different vehicle movements. Other vibration causing mechanisms may be used in addition to or as an alternative to any or all of the diaphragms.

Figure 10:
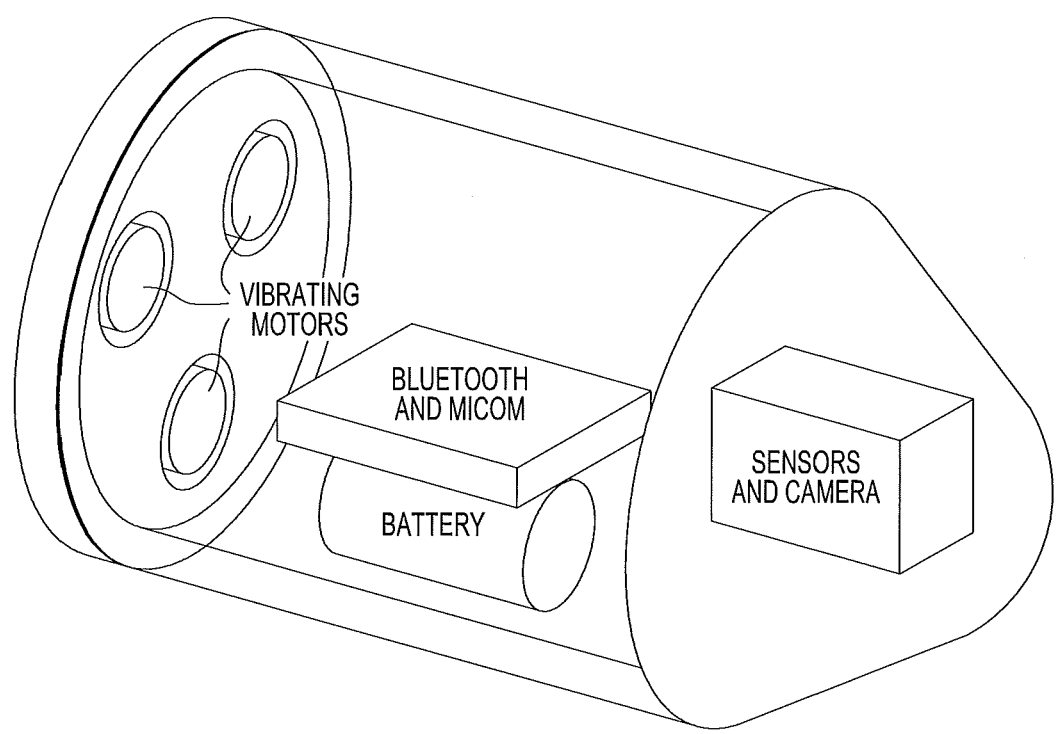
FIG. 10 is a perspective view of another present preferred device having three vibrating diaphragms on the back of the device for propulsion and steering.
Figure 11:
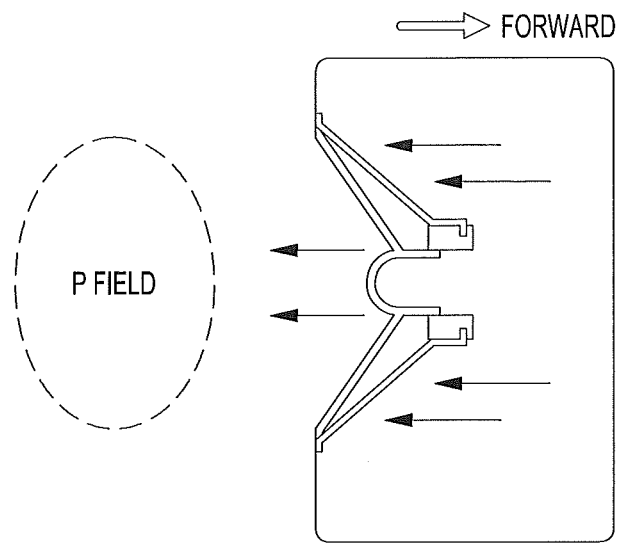
FIG. 11 is a schematic view illustrating the forces for movement created by a diaphragm of the embodiment of the device shown in FIG. 2 when the diaphragm is extended.
Figure 12:
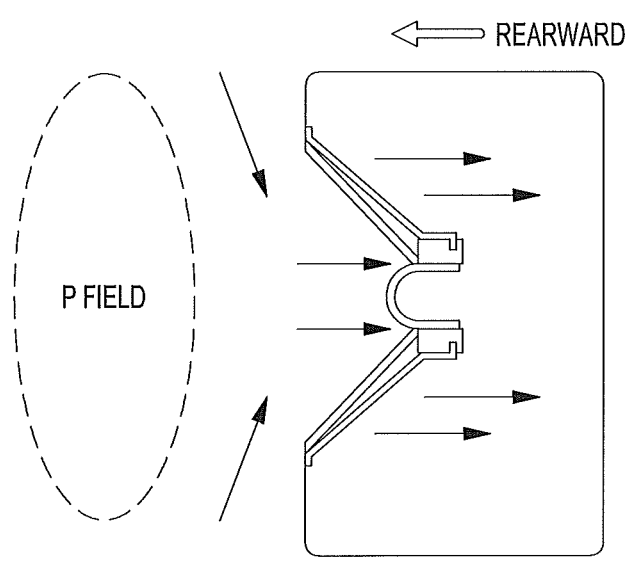
FIG. 12 is a schematic view illustrating the forces for movement created by a diaphragm of the embodiment of the device shown in FIG. 2 when the diaphragm is retracted.

Referring to FIGS. 10-12, a device may be sized and shaped for being swallowed by a human for traveling through a digestion tract of a human body, or may be sized and shaped for depositing into another portion of an animal body or an organ of a human. The device may include a housing that has a tapered head in which a camera and sensors or detectors are stored. The sensors, detectors, and camera may be connected to a wireless transceiver, such as a Bluetooth enabled transceiver, for receiving instructions and transmitting data to another device, such as a computer or controller that may wirelessly control the sensors and camera. At least one processor may also be attached within the housing and be connected to the sensors, detectors and camera for controlling operation of the sensors, detectors and camera. The processor may also be attached to a battery for receiving power and may also be connected to vibration causing motors, or diaphragms, that are configured to vibrate to move the device. The diaphragms may also be connected to the battery for receiving energy to power the mechanisms. Similarly, the camera and other sensors in the head of the device may also be linked to the battery for receiving power via the battery. In addition to the diaphragms, the device may include one or more other vibration causing mechanisms that move a weight forwardly and rearwardly in cycles for moving the device or may include one or more collapsible sections formed in the housing that may extend and retract to drive movement of the device. Mechanisms that move a weight sidewardly or along an angle relative to the longitudinal direction of the device may also be utilized to generate vibrations of the device for moving the device.

The diaphragms may be located on an end of the device opposite the head of the device and may be configured to move the device via vibration, as can be appreciated from FIGS. 11-12, which illustrate how extension and retraction of the each diaphragm may cause a movement in a desired direction. In alternative embodiments, vibration mechanisms configured to move a weight forwardly and rearwardly within the housing may replace one or all of the diaphragms.

The processor may be connected to the diaphragm mechanisms or other vibration causing mechanisms for controlling each diaphragm's movement or to permit a user to provide input via the transceiver to control movement of the device. For instance, a user may utilize a remote controller, a computer or other computer device to communicate instructions to the device via the transceiver of the device so that the processor can receive such input and control movement of the diaphragms to steer the device or to adjust or otherwise affect operation of the camera or other sensors. The transceiver of the device may also transmit data collected by the sensors, detectors or camera of the device to the computer device for the computer device to store such data or otherwise use or manipulate such data. The transceiver may be a wireless transceiver such as a radio frequency based wireless transceiver or an infrared signal wireless transceiver.

Alternatively, instructions for controlling movement of the device may be stored on memory that is processed by a processing unit positioned in the device. The memory may be locally positioned in the housing and connected to the processor unit. The memory may have instructions that cause movement of the device when executed and also identify and instruct the device when to transmit data collected by one or more sensors. Such instructions may permit such embodiments to act as a robot or similarly to a robot.

It should be appreciated that a number of different variations to embodiments of the device discussed herein may also be made. For instance, embodiments of the device may be utilized for a number of different environments to achieve a particular design objective. Such changes can impact the size, shape, and configuration of the device's housing and the particular vibration propulsion system that may be utilized in such a device.

While certain present preferred embodiments of the device and certain embodiments of methods of practicing the same have been shown and described, it is to be distinctly understood that the invention is not limited thereto but may be otherwise variously embodied and practiced within the scope of the following claims.

What is claimed is:

1. A device comprising:
   a housing; and
   at least one vibration causing mechanism comprising at least one of:
      at least one vibratable diaphragm attached to the housing, the at least one vibratable diaphragm positioned such that each of the at least one vibratable diaphragm moves from an extended position extending away from the housing to a retracted position that is positioned closer to an interior of the housing than the extended position to drive movement of the device, and
      at least one vibration causing device positioned in the housing that moves a weight forwardly and rearwardly within the housing to vibrate the housing to drive movement of the device;
   wherein the housing has a front and a back and wherein the housing is shaped such that a cycle of movement of the at least one vibration causing mechanism provides a drag characteristic such that when the housing is within a fluid or is covered in a fluid, the housing moves forwardly for each of the cycle of movement of the at least one vibratable diaphragm.

2. The device of claim 1 wherein the device is sized and configured to move within a human body, or move in a body of water.

3. The device of claim 1 further comprising at least one power source connected to the at least one vibration causing mechanism within the housing, the at least one power source being connected to a controller device via a direct connection or a wireless connection; and wherein the at least one vibration causing mechanism is comprised of the at least one vibration causing device, the at least one vibration causing device comprising a first vibration causing device having a motor that moves the weight from a first position to a second position and then moves the weight from the second position back to the first position in cycles, the weight being moved at a first rate of speed when moving from the first position to the second position and the weight being moved at a second rate of speed when moving from the second position to the first position to complete a cycle of movement of the weight, the first rate of speed being faster or slower than the second rate of speed to generate asymmetric vibrations to provide a net movement in a desired direction after each cycle of movement of the weight.

4. The device of claim 3 wherein the connection to the at least one power source is comprised of a wireless power connection or a wired power connection and wherein the controller device is a wireless controller that controls steering and direction of movement for the device.

5. The device of claim 1 further comprising at least one moveable member that moves between a retracted position and an extended position during cycles of movement of the at least one vibration causing mechanism that are used to generate vibrations for driving movement of the device.

6. The device of claim 1 wherein the housing defines a payload for the device, the payload portion configured to releasably retain a drug, retain a surgical instrument or retain a treatment mechanism.

7. The device of claim 1 further comprising at least one of: a sensor, a detector and a camera positioned within the housing and being connected to a processor unit positioned in the housing, the processor unit also being connected to the at least one vibration causing mechanism, the device also comprising a wireless transceiver positioned in the housing that is connected to the processor unit.

8. A device comprising:
   a housing; and
   at least one vibration causing mechanism comprising at least one of:
      at least one vibratable diaphragm attached to the housing, the at least one vibratable diaphragm positioned such that each of the at least one vibratable diaphragm moves from an extended position extending away from the housing to a retracted position that is positioned closer to an interior of the housing than the extended position to drive movement of the device, and
      at least one vibration causing device positioned in the housing that moves a weight forwardly and rearwardly within the housing to vibrate the housing to drive movement of the device;
   wherein the housing has a bullet-like shape, a submarine shape or a conical shape and wherein the at least one diaphragm vibrates by moving parallel to a flow direction of a fluid or a moving surface to drive movement of the device.

9. A device comprising:
   a housing; and
   at least one vibration causing mechanism comprising at least one of:
      at least one vibratable diaphragm attached to the housing, the at least one vibratable diaphragm positioned such that each of the at least one vibratable diaphragm moves from an extended position extending away from the housing to a retracted position that is positioned closer to an interior of the housing than the extended position to drive movement of the device, and
      at least one vibration causing device positioned in the housing that moves a weight forwardly and rearwardly within the housing to vibrate the housing to drive movement of the device;
   at least one covering attached to the housing, the at least one covering that covers a portion of the housing and the at least one covering flopping during movement of the device.

10. The device of claim 9 wherein the at least one covering flops between a first position and a second position such that a width or height of the device is greater when the at least one covering is in the second position relative to when the at least one covering is in the first position.

11. The device of claim 9 wherein the at least one covering flops between the first and second positions for every vibration cycle of the at least one vibration causing mechanism.

12. A device comprising:
   a housing; and
   at least one vibration causing mechanism comprising at least one of:
      at least one vibratable diaphragm attached to the housing, the at least one vibratable diaphragm positioned such that each of the at least one vibratable diaphragm moves from an extended position extending away from the housing to a retracted position that is positioned closer to an interior of the housing than the extended position to drive movement of the device, and at least one vibration causing device positioned in the housing that moves a weight forwardly and rearwardly within the housing to vibrate the housing to drive movement of the device;

wherein the housing has at least one collapsible section sized and configured so that cycling of the at least one collapsible section between extended and contracted positions contributes to movement of the device.

13. A device comprising:

a housing having at least one collapsible section, and at least one power unit attached to the at least one collapsible section to cycle the at least one collapsible section between extended and collapsed positions; and the housing and the at least one collapsible section sized and configured so that cycling of the at least one collapsible section between extended and collapsed positions moves the device when the device is positioned in a fluid.

14. The device of claim 13 further comprising at least one covering attached to the housing, the at least one covering flopping during movement of the device.

15. The device of claim 14 wherein the at least one covering flops between a first position and a second position such that a width or height of the device is greater when the at least one covering is in the second position relative to when the at least one covering is in the first position.

16. The device of claim 15 further comprising at least one vibration causing mechanism positioned within the housing.

17. The device of claim 15 wherein the at least one power unit also powers flopping of the at least one covering.

18. The device of claim 17 wherein the at least one power unit is comprised of at least one of a wireless power unit and a wired power unit and wherein the device further comprises a controller connected to the at least one collapsible section and the at least one covering to control the at least one collapsible section and the at least one covering such that the controller controls movement of the device.

19. The device of claim 13 wherein the device is sized and configured to move within a human body, or move in a body of water.

\* \* \* \* \*